Dec. 8, 1931.  B. DICK  1,835,763

HYDRAULIC BRAKE

Filed July 11, 1928  2 Sheets-Sheet 1

Inventor
Burns Dick
By E. O. Huffman
Att'y.

Dec. 8, 1931.  B. DICK  1,835,763
HYDRAULIC BRAKE
Filed July 11, 1928  2 Sheets-Sheet 2

Inventor
Burns Dick
By E. E. Huffman
Att'y.

Patented Dec. 8, 1931

1,835,763

UNITED STATES PATENT OFFICE

BURNS DICK, OF ST. LOUIS, MISSOURI, ASSIGNOR TO WAGNER ELECTRIC CORPORATION, OF ST. LOUIS, MISSOURI, A CORPORATION OF DELAWARE

HYDRAULIC BRAKE

Application filed July 11, 1928. Serial No. 291,722.

Figure 1:
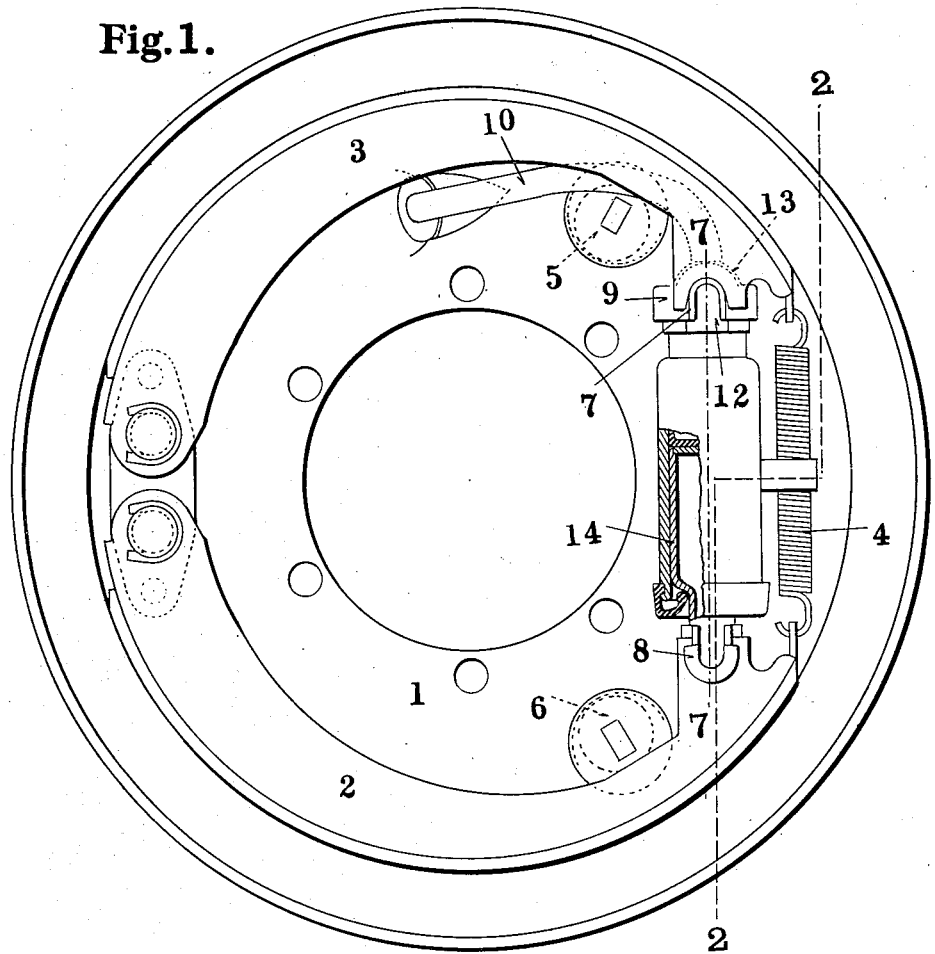
Figure 2:
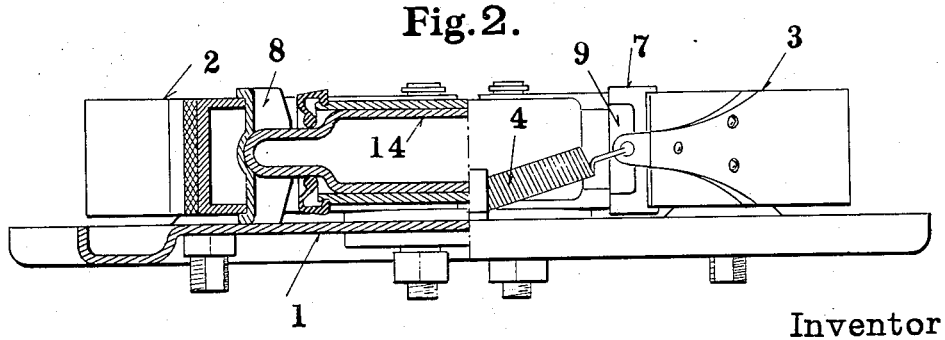
Figure 3:
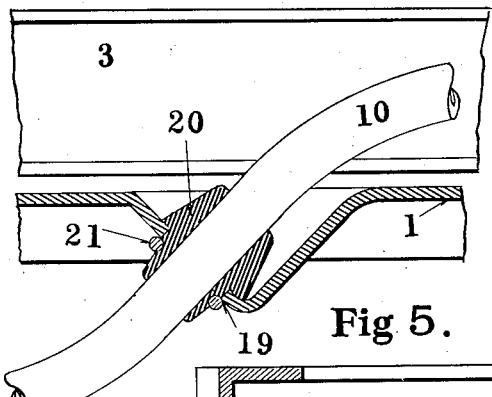
Figure 4:
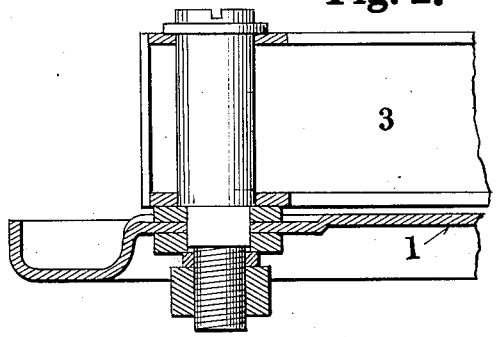
Figure 5:
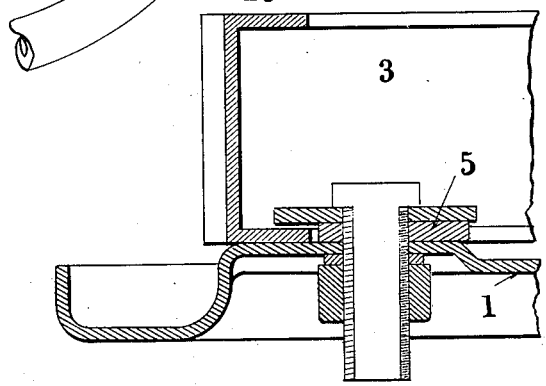
Figure 6:
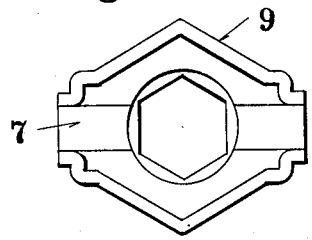
Figure 7:
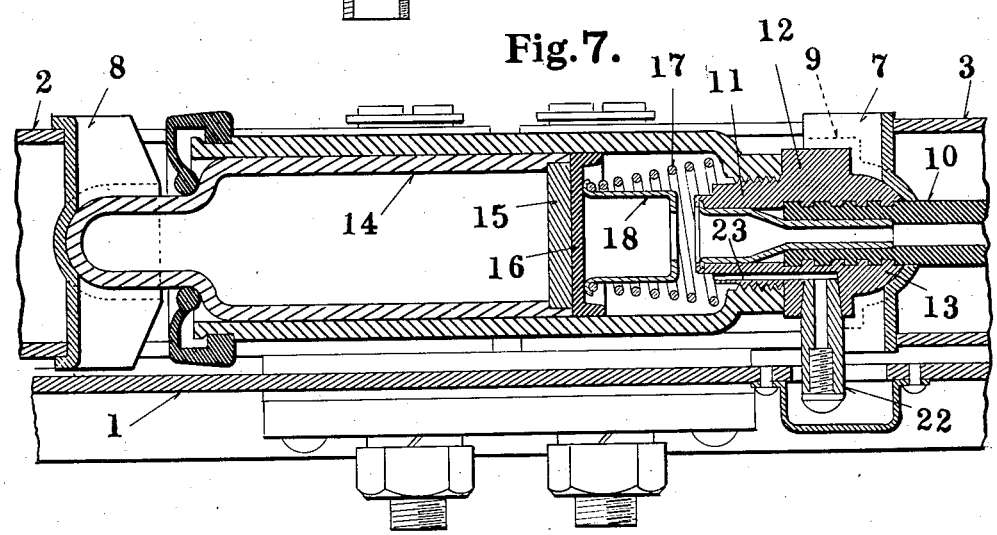

The purpose of this invention is to simplify and reduce the cost of hydraulically operated vehicle brakes and comprises features and advantages hereinafter set forth in connection with the description of the particular embodiment illustrated in the accompanying drawings in which Figure 1 is a view partly in elevation and partly in section of a two-shoe internal brake mechanism embodying my invention, (the brake drum being omitted); Figure 2 is a vertical cross-section on the line 2—2 of Figure 1; Figure 3 is a detail view showing the manner of bringing the flexible liquid conduit out of the brake mechanism; Figure 4 is a fragmentary sectional view showing one of the brake shoes and its mounting pivot; Figure 5 is a cross-sectional view of the means for adjusting the shoes to compensate for brake lining wear; Figure 6 is a plan view of the socket piece on one of the brake shoes with which the end of the brake actuating cylinder engages; and Figure 7 is an enlarged section on the line 7—7 of Figure 1.

The brake mechanism illustrated comprises a mounting plate 1 which usually extends over the open end of the brake drum and forms a closure therefor, and brake shoes 2 and 3 pivoted to this mounting plate at one end as indicated and having their free ends impelled to braking position by hydraulic means and retracted to "off" position by the spring 4 connecting the ends of the shoe. To compensate for wear of brake lining the retracted position of the shoes may be changed by means of the eccentric adjusting means carried by the mounting plate 1, shown in Figure 5 and at 5 and 6 in Figure 1.

My invention chiefly relates to the hydraulic means for actuating the brake shoes, its object being to substantially reduce the number of parts and the cost of such means in comparison with prior constructions with which I am familiar.

Referring to Figures 1, 2 and 6, the side walls of the channel section brake shoes 2 and 3 have semi-circular openings formed in their ends in which openings are seated the yokes or socket pieces 7 and 8 which are of stamped metal and which may have such fit as to be capable of some relative rotation with respect to the body of the shoe. Each of these socket pieces is preferably provided with a spherical bearing surface at the center of its bottom portion for receiving and forming a ball and socket joint with parts of the piston and cylinder of the hydraulic mechanism. The socket piece 7 also preferably has an extension 9 whose inner contour is non-circular for the purpose to be hereinafter referred to, and also has a central opening for the passage of the flexible hose 10 by means of which hydraulic pressure is communicated to the operating cylinder. In the form illustrated this operating cylinder comprises preferably a drawn metal cup having a threaded closure 11 in one end, to which closure the flexible hose 10 is permanently secured. This closure or connector is provided with a hexagonal portion 12 and with a hemispherical portion 13 adapted to bear on the spherical surfaced seat in the socket piece 7. The non-circular inner contour of the extension 9 of the socket piece 7 cooperates with the hexagonal portion 12 of the connector to prevent rotation of the latter.

The piston cooperating with the cylinder comprises a drawn metal cup 14 having its bottom portion extended, as shown, to form a semi-spherical bearing part to engage the spherical surface in the socket piece 8 on the brake shoe 2. Preferably the end of the piston is closed by means of the closure plate 15 which forms a seat for the packing cup 16. The periphery of this packing cup engages the wall of the cylinder and the cup is maintained against the piston by means of the spring 17. The metal cup member 18, which is held in position by the spring, engages with the end of the closure 11 in the cylinder and forms a stop preventing inward travel of the piston beyond a desired point under the influence of the spring 4, should the position of the stop members 5 and 6 not be such at all times to properly limit this travel.

The flexible hose 10 extends from the cylinder to the liquid piping on the vehicle (not shown) and in order that there be a sufficient length of this hose within the brake mechanism to accommodate the motion of the shoe 3, I locate the opening 19 in the mounting plate 1 through which the hose passes, at a substantial distance from the point of connection of the hose with the cylinder. The hose is preferably provided with a bushing 20 at the point where it passes through the mounting plate, this bushing being positioned by a shoulder thereon engaging one side of the plate and a spring ring 21 seated in a groove in the bushing and engaging the other side of the plate.

The cylinder closure member 11 is provided with a bleeder tube 22 and connecting passage 23 whereby air may be expelled from the apparatus as is necessary in initially filling hydraulic braking apparatus with the braking fluid. This feature of construction is claimed in a co-pending joint application of Mr. Steve Schnell and myself, Serial No. 291,723, filed July 11, 1928.

It will be noted that the piston and cylinder of my apparatus are maintained in position entirely by the brake shoes and in order that there be no tendency, even such as would be due to the small weight of the piston and cylinder, for the axes of the cylinder and piston to assume a position out of alignment, I prefer to position them vertically, as shown in Figure 1. In this position their weight rests upon the lower shoe, since the cylinder is not mechanically attached to the upper shoe, and there is no tendency for their bearing parts to get out of alignment with the bearing parts of the shoes.

It will be apparent that by causing the piston and cylinder to bear directly on the shoes and be supported thereby without being mechanically attached thereto, I have eliminated several parts heretofore employed in such mechanism and have secured a floating actuator capable of readily accommodating its position to the positions of the brake shoes and applying to the shoes, without loss of efficiency, the braking pressure transmitted to it.

Having fully described my invention, what I claim as new and desire to secure by Letters Patent of the United States is:

1. A braking apparatus comprising a pair of brake shoes, each of said shoes being provided with a socket bearing part, one of said bearing parts having an opening therethrough, means for actuating the shoes comprising a piston member and a cylinder member cooperating therewith, one of said members having a closure for one end provided with a liquid passage therethrough and bearing directly on the bearing part having the opening therethrough, and a fluid conduit communicating with the passage through the closure member and passing through said opening.

2. A braking apparatus comprising a pair of brake shoes, one of said shoes being provided with a socket bearing part having a spherical bearing surface at its bottom and an extension having a non-circular inner contour, cooperating piston and cylinder members for actuating the shoes, one of said members being provided with a threaded closure through which operating liquid is conveyed to the cylinder, one part of said closure being adapted to bear on the spherical surface of the socket bearing part and another part being so shaped and positioned that the non-circular inner contour of the socket bearing part prevents rotation of the closure member.

3. In apparatus of the class described, brake shoe actuating means comprising cooperating cylinder and piston members, the piston member being a drawn metal cup having an integral extension formed in its bottom to constitute a brake shoe engaging part, a plate at its other end, and a packing cup bearing on said plate and engaging the cylinder wall.

4. In hydraulic braking apparatus, a pair of brake shoes, a flexible hose for transmitting liquid pressure and provided with a connector permanently secured to the end thereof, and means for actuating said shoes comprising a cylinder member and a piston member cooperating therewith, said hose connector separably engaging one end of one of said members and bearing directly on one of the brake shoes to transmit the braking pressure thereto.

5. A braking apparatus comprising a pair of brake shoes, hydraulic means for actuating said shoes and comprising cooperating piston and cylinder members, a flexible conduit for conveying liquid to the cylinder, and a connector permanently secured to the end of said conduit and in threaded engagement with the end of said cylinder and in alignment with the piston, a rear part of said connector being adapted to bear on one of the brake shoes to transmit braking pressure thereto.

In testimony whereof, I hereunto affix my signature, this 9th day of July, 1928.

BURNS DICK.